United States Patent [19]

Shimanuki et al.

[11] Patent Number: 4,883,325

[45] Date of Patent: Nov. 28, 1989

[54] ANTI-LOCK BRAKE CONTROL SYSTEM FOR MOTOR VEHICLES

[75] Inventors: Haruki Shimanuki, Kasukabe; Takao Maki, Kitakatsushika; Yoshio Takahashi, Ohmiya, all of Japan

[73] Assignee: Akebono Brake Industry Co., Ltd., Japan

[21] Appl. No.: 308,823

[22] Filed: Feb. 9, 1989

[30] Foreign Application Priority Data

Feb. 12, 1988 [JP] Japan .................................. 63-28924

[51] Int. Cl.$^4$ .............................................. B60T 8/82
[52] U.S. Cl. ...................................... 303/96; 303/100; 303/103; 303/105; 303/108; 364/426.02
[58] Field of Search .................. 303/91, 95, 96, 97, 303/98, 99, 100, 102, 103, 105, 106, 107, 108, 109, 110; 364/426.02

[56] References Cited

U.S. PATENT DOCUMENTS

| | | | |
|---|---|---|---|
| 4,637,663 | 1/1987 | Matsuda | 303/97 X |
| 4,660,896 | 4/1987 | Matsuda | 303/97 X |
| 4,662,686 | 5/1987 | Matsuda | 303/106 |
| 4,681,374 | 7/1987 | Nakamura et al. | 303/96 X |
| 4,717,209 | 1/1988 | Hagiya et al. | 303/103 X |
| 4,739,484 | 4/1988 | Fennel | 303/103 X |
| 4,741,580 | 5/1988 | Matsubara et al. | 303/105 |
| 4,750,124 | 6/1988 | Lin et al. | 303/97 X |
| 4,763,960 | 8/1988 | Uchida et al. | 303/100 X |
| 4,797,825 | 1/1989 | Shimanuki et al. | 303/96 X |
| 4,807,133 | 2/1989 | Shimanuki et al. | 303/105 X |

*Primary Examiner*—Douglas C. Butler

[57] ABSTRACT

In an anti-lock control system for motor vehicles, the design is made such that when the motor vehicle is running on a rough road, reduction of the brake hydraulic pressure can be prevented from being started early by detecting that the motor vehicle is running on the rough road, and such that any adverse effects can be avoided which tend to be produced in the case where a device for coping with the rough road is applied when the road surface on which the motor vehicle is running is a low-$\mu$ road surface or when the motor vehicle is running with a low speed.

13 Claims, 7 Drawing Sheets

FIG. I
PRIOR ART

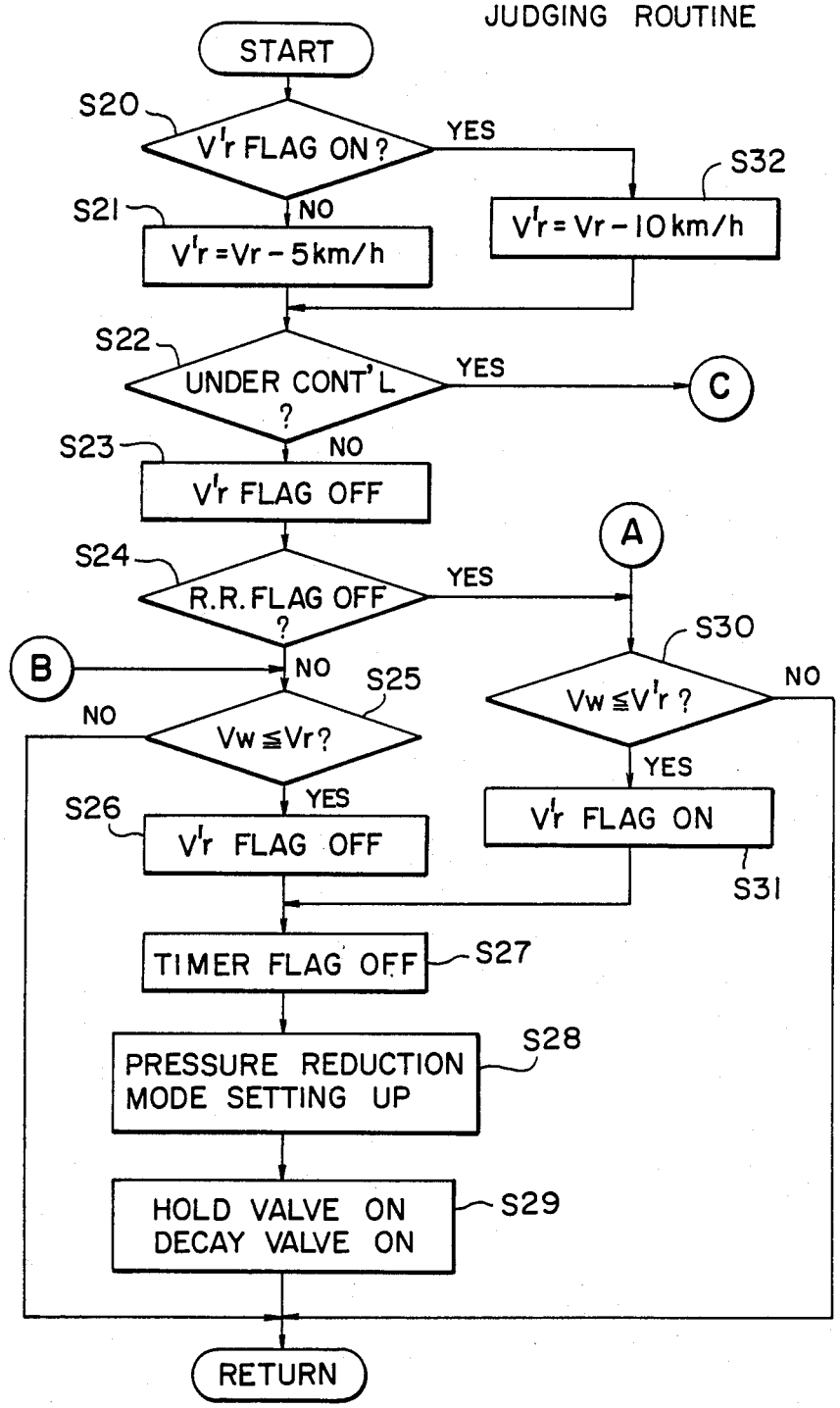
FIG. 7A PRESSURE REDUCTION STARTING POINT JUDGING ROUTINE

ANTI-LOCK BRAKE CONTROL SYSTEM FOR MOTOR VEHICLES

BACKGROUND OF THE INVENTION

1. Field of the Invention:

This invention relates to a novel and improved anti-lock control system for motor vehicles, which is operative to prevent the wheels of the motor vehicle from being locked during braking operation of the motor vehicle.

2. Description of the Prior Art:

Generally, with an anti-lock control system for motor vehicles, anti-lock control is effected by means of microcomputers such that hold valves and decay valves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

FIG. 1 of the accompanying drawings illustrate, by way of example, manners in which wheel speed Vw, wheel acceleration and deceleration dVw/dt and brake hydraulic pressure Pw are varied during the operation of the conventional anti-lock control system, together with hold signal HS and decay signal DS for opening and closing hold valves and decay valves, as disclosed in U.S. Pat. No. 4,741,580.

When the brake equipment of the motor vehicle is not being operated while the motor vehicle is running, the hold valves remain open while the decay valves remain closed, the brake hydraulic pressure Pw is not increased; and when the brake equipment is operated, the brake hydraulic pressure Pw is rapidly increased at time t0 so that the wheel speed Vw is decreased (normal mode). A reference wheel speed Vr is set up which is lower by a predetermined amount ΔV than the wheel speed Vw and follows the latter with such a speed difference. More specifically, reference wheel speed Vr is set up so that when the deceleration (negative acceleration) dVw/dt of the wheel reaches a predetermined threshold level, say −1.1G at time t1, anti-lock control is started, and the reference wheel speed Vr is thereafter made to linearly decrease with a deceleration gradient Θ (=−1.1G). At time t2 when the deceleration dVw/dt of the wheel reaches a predetermined maximum value −Gmax, the hold signal HS is generated so that the hold valves are closed, thus holding the brake hydraulic pressure Pw.

With the brake hydraulic pressure Pw being held, the wheel speed Vw is further decreased. At time t3, the wheel speed Vw and the reference wheel speed Vr become equal to each other, and a first cycle of anti-lock control is started; and the decay signal DS is generated, by which the decay valves are opened so that reduction of the brake hydraulic pressure Pw is started. As a result of this reduction of the brake hydraulic pressure Pw, the wheel speed Vw is changed from increase to decrease at time t4 when a low peak VL of the wheel speed Vw occurs. The decay signal DS is interrupted either at the time t4 or at time t5 when the wheel speed Vw is increased up to the level of a speed Vb that is higher than the low peak speed VL by 15% of the difference Y between the wheel speed Va occurring at the time t3 when the reduction of the brake hydraulic pressure was started and the low peak speed VL, i.e., Vb=VL+0.15Y (FIG. 1 shows the case where the decay signal DS is interrupted at the time t5). Thus, the decay valves are closed so that the reduction of the brake hydraulic pressure Pw is stopped and thus the brake hydraulic pressure is held. The wheel speed Vw is further increased up to the level of a speed Vc that is higher than the low peak speed VL by 80% of the difference Y between the wheel speed Va occurring at the time t3 when the reduction of the brake hydraulic pressure Pw was started and the low peak speed VL, i.e., Vc=VL+0.8Y.

Subsequently, at time t7, a high peak VH of the wheel speed Vw is reached; thereupon, the brake hydraulic pressure Pw is again increased. In this case, the buildup of the brake hydraulic pressure Pw is effected in such a manner that the brake hydraulic pressure Pw is alternately increased and held in succession by the fact that the hold signal HS is turned on and off mincingly, or with relatively short intervals so that the brake hydraulic pressure Pw is caused to gradually build up. In this way, the wheel speed Vw is decreased, and at time t8 (corrsponding to the time 3), a second cycle of the mode for reduction of the brake hydraulic pressure occurs. The time period Tx of the initial brake hydraulic pressure occurs. The time period Tx of the initial brake hydraulic pressure buildup occurring at the time t7 is determined on the basis of calculation of the average acceleration (Vc−Vb)/ΔV over the time interval ΔT between the time t5 and the time t6 (the average acceleration depends on the friction coefficient μ of the road surface), and the time period of the subsequent pressure holding or pressure buildup is determined on the basis of the acceleration or deceleration of the wheel which is detected immediately prior to the pressure holding or pressure buildup. The brake hydraulic pressure increasing, holding and reducing modes are effected in combination as mentioned above, and thus the wheel speed Vw can be controlled so that the vehicle speed can be decreased, while the wheels of the motor vehicles are prevented from being locked.

When the motor vehicle is running on a rough road, it frequently happens that the wheels thereof are caused to float in the air. In such a state, if the brake equipment of the vehicle is being operated, the wheels floating in the air will be rapidly decelerated; and when caused to land on the road again, those wheel start rotation again so that changes in the wheel speeds turn out to be different from those which occur when the vehicle is running on a normal road. More specifically, when the vehicle is running on a rough road, the cycle of the anti-lock control turns out to be faster than when the vehicle is running on a normal road, and the amplitude of the wheel speed Vw also becomes larger.

The conventional anti-lock control system is disadvantageous in that in case slow or quick braking is applied when the motor vehicle is running on a rough road, reduction of brake hydraulic pressure will be frequently started due to changes in the wheel speeds so that the brake hydraulic pressure will be prevented from building up, as a result of which the braking distance will be increased.

There has heretofore been proposed means for solving the above-mentioned problems by delaying a hydraulic brake pressure reduction starting point when the road surface on which the motor vehicle is running is judged as a rough one. However, the means has such a disadvantage that in case the road surface on which the motor vehicle is running has a low friction coefficient $\mu$ (low-$\mu$ road surface), when the road surface is misjudged as a rough one, the brake hydraulic pressure will not be increased until the delayed pressure reduction starting point is reached, so that the wheel speed will drop too deeply. Another disadvantage is such that the wheels tend to be subjected to early-locking when the road surface on which the motor vehicle is running at a low speed is judged as a rough road surface.

SUMMARY OF THE INVENTION

Accordingly, it is an object of the present invention to provide an anti-lock control system for motor vehicles, which is so designed that when the motor vehicle is running on a rough road, reduction of the brake hydraulic pressure is prevented from being started early by detecting that the motor vehicle is running on the rough road, and which is also designed so that any adverse effects can be avoided which tend to be produced in the case where means for coping with the rough road is applied when the road surface on which the motor vehicle is running is a low-$\mu$ road surface or when the motor vehicle is running with a low speed.

Brief state, according to the present invention, where is provided an anti-lock control system for motor vehicles, wherein respective wheel speeds Vw are detected and a computed vehicle speed Vv approximate to the actual wheel is calculated on the basis of the wheel speeds Vw as detected; and wherein a reference wheel speed Vr is set up which is lower by a predetermined amount $\Delta V$ than wheel speed accelerated through buildup of the brake hydraulic pressure and follows the wheel speed with a speed difference corresponding to said amount $\Delta V$, said reference wheel speed being decelerated, from a time point when the deceleration of the wheel speed reaches a predetermined deceleration level onward, with a predetermined deceleration gradient to hold said predetermined deceleration level; and at time point when said reference wheel speed becomes equal to said wheel speed, reduction of the brake hydraulic pressure is started so that said wheel speed is changed from decrease to increase, said anti-lock control system comprising means for setting up two threshold values Vv1 and Vv2 following the computed vehicle speed Vv with respective predetermined speed differences $\Delta V1$ and $\Delta V2$; means for measuring a time period T during which the vehicle speeds Vw reciprocate between the two threshold values Vv1 and Vv2 once; means for judging that a rough-road judging condition is established when the time period T is shorter than a predetermined time period T1, and for changing said reference wheel speed Vr to a second reference wheel speed Vr' which follows the wheel speed with a predetermined speed difference $\Delta V'$ greater than said speed difference $\Delta V$, thereby preventing the reduction of the brake hydraulic pressure from being started early.

Furthermore, according to the present invention, when the aforementioned rough-road judging condition is still prevailing at the second or succeeding control cycle started at a pressure buildup starting point subsequent to a time point when reduction of the brake hydraulic pressure is started on the basis of said reference wheel speed Vr, the speed difference $\Delta V'$ with which the reference wheel speed Vr' follows the wheel speed Vw is changed to a greater speed difference $\Delta V''$. The reduction of the brake hydraulic pressure is started on the basis of the reference wheel speed Vr when the deceleration gradient of the computed wheel speed Vv between the pressure buildup starting point for the previous control cycle and that for the current control cycle is steeper than a predetermined value, or when the computed vehicle speed Vv is lower than a predetermined speed, at and after the second control cycle started from a pressure buildup starting point subsequent to a time point when reduction of the brake hydraulic pressure is started on the basis of the reference wheel speed Vr.

As will be appreciated from the above discussion, in accordance with the present invention, when the aforementioned rough-road judging condition is satisfied, the reference wheel speed Vr which is used for judgment of a pressure reduction starting point is changed to a second reference wheel speed Vr' having a greater difference with respect to the wheel speed Vw than the first-mentioned reference wheel speed Vr, thereby making it possible to effect highly accurate rough-road judgment so as to prevent reduction of the brake hydraulic pressure from being started early when braking is applied while the motor vehicle is running on a rough road, while at the same time reducing the number of times that the anti-lock control operation is performed, and shortening the braking distance.

According to a further aspect of the present invention, the reference wheel speed Vr' is set up at two stages by changing the speed difference with which the reference wheel speed Vr' follows the wheel speed Vw from $\Delta V'$ to $\Delta V''$; and during the anti-lock control operation, the aforementioned means for coping with a rough road is not operated when the computed vehicle speed Vv is lower than a predetermined value or its deceleration gradient is less than a predetermined value. In this way, it is possible to eliminate such problems that the wheel speed Vw tends to drop too deeply when the road on which the motor vehicle is running and which has a low friction coefficient (low-$\mu$ road) is misjudged as a rough road and that early locking of the wheels tends to be caused when the road on which the motor vehicle is running with a low speed is judged as rough road.

Other objects, features and advantages of the present invention will become apparent from the ensuing description taken in conjunction with the accompanying drawings.

DESCRIPTION OF THE PREFERRED EMBODIMENTS

The anti-lock control system for motor vehicles according to an embodiment of the present invention will now be described with reference to the accompanying drawings.

Figure 1:
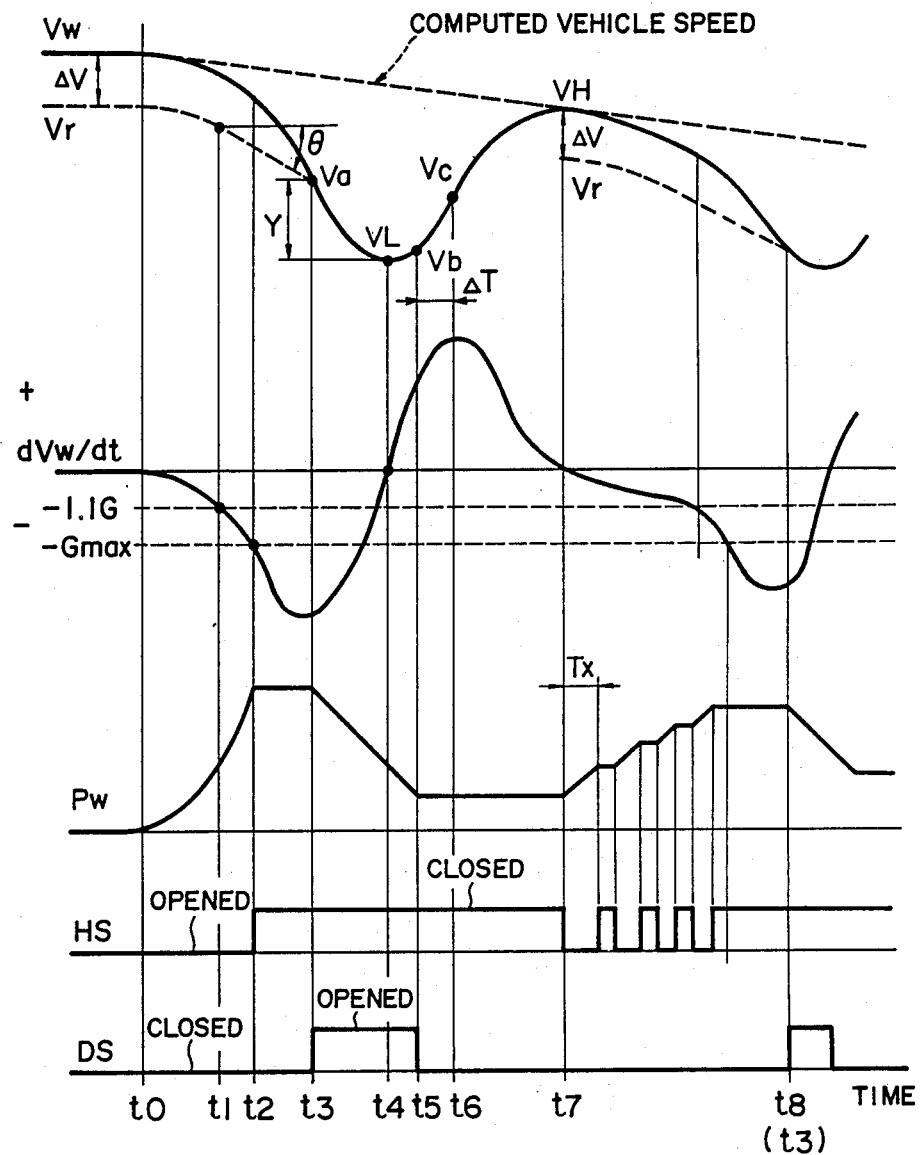
FIG. 1 is a view useful for explaining how anti-lock control is effected with the prior-art anti-lock control system for motor vehicles.
Figure 2:
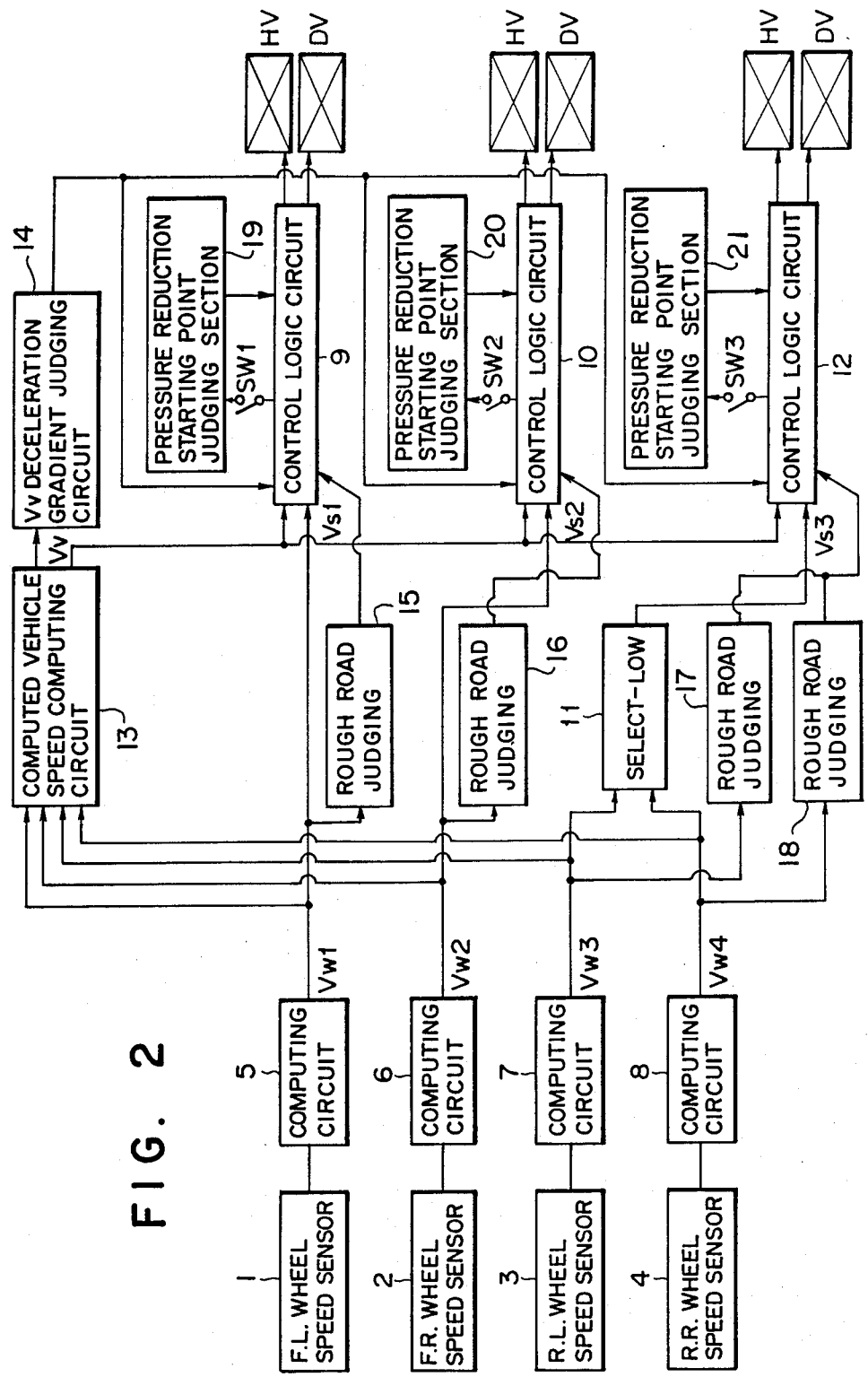
FIG. 2 is a block diagram showing a four-sensor, three-channel type anti-lock control system according to an embodiment of the present invention.

Referring to FIG. 2, which is a block diagram illustrating the construction of a four-sensor, three-channel anti-lock control apparatus adapted for working the present invention, which includes lefthand front, righthand front, lefthand rear and righthand rear wheel speed sensors 1 to 4. Outputs of these wheel speed sensors 1 to 4 are respectively passed to computing circuits 5 to 8 from which signals representing respective wheel speeds $Vw1$ to $Vwl$ are derived. Of the four wheel speed signals, the signals representing the lefthand front wheel speed $Vw1$ and the righthand front wheel speed $Vw2$ are transmitted to control logic circuits 9 and 10 as signals representing first and second channel speeds $Vs1$ and $Vs2$ respectively. The lower one of the lefthand rear wheel speed $Vw3$ and righthand rear wheel speed $Vw4$ is selected in a select-low circuit 11 and is passed to a control logic circuit 12 as a signal representing a third channel speed $Vs3$.

The signals representing the respective wheel speeds $Vw1$ to $Vw4$ are transmitted to a circuit 13 for calculating computed vehicle speed, in which the highest one of the four wheel speeds $Vw1$ to $Vw4$ is selected (select-high) and a speed of which follow-up limit with respect to the highest wheel speed thus selected is limited in the range from $+1G$ to $-1G$, is calculated at computed vehicle speed $Vv$. The signal representing the computed vehicle speed $Vv$ provided as above is transmitted to the respective control logic circuits 9, 10 and 12, and is further transmitted to a circuit 14 for judging the deceleration gradient of the computed vehicle speed $Vv$; and a signal representing the deceleration gradient is passed to the respective control logic circuits 9, 10 and 12.

Rough-road judging sections 15, 16, 17 and 18 are provided to judge whether a rough-road judging condition is established or not, on the basis of signals received from the respective computing circuits 5 to 8. When the rough-road judging condition is established, a signal representing this fact is transmitted to the control logic circuits 9, 10 and 12.

The control logic circuits 9, 10 and 12 are arranged to effect "on"-"off" control of hold valves and decay valves in the respective channels on the basis of the signals representing the respective channel speeds $Vs1$ to $Vs3$ and that representing the computed vehicle speed $Vv$. In particular, pressure reduction starting point judging sections 19 to 21 are connected to output terminals of the respective control logic circuits 9, 10 and 12 are provided in the respective channels to judge a pressure reduction starting point when "on" control of the decay valves is started. The pressure reduction starting point judging sections 19 to 21 are connected to output terminals of the respective control logic circuits 9, 10 and 12 through switches SW1 to SW3, and directly to input terminals of the control logic circuits 9, 10 and 12. The respective switches SW1 to SW3 are turned on when the anti-lock control is not effected (until the pressure reduction in the first control cycle is started) or when a pressure buildup mode occurs. When a pressure reduction starting point is judged in the pressure reduction starting point judging sections 19 to 20, the switches SW1 to SW3 are turned off between the pressure reduction starting point and a subsequent pressure buildup starting point.

Figure 3:
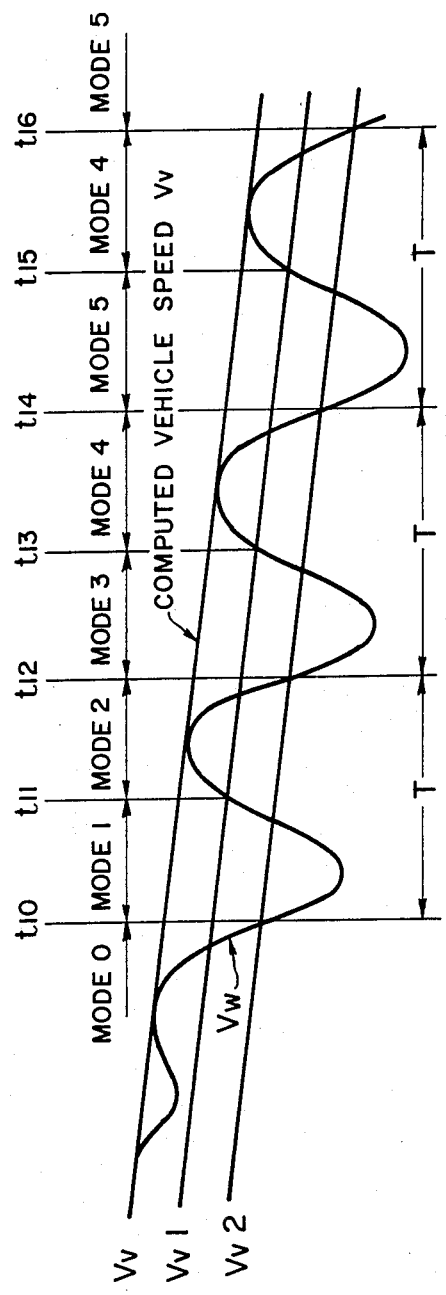
FIG. 3 is a view useful for explaining rough-road judging operation in the anti-lock control system of FIG. 2.

FIG. 3 is view useful for explaining the method for judging a rough road in the embodiment of the present invention. In FIG. 3, a first threshold value $Vv1$ is set up which follows the computed vehicle speed $Vv$ with a first predetermined speed difference $\Delta V1$ (e.g., 2.5 km/h), and a second threshold value $Vv2$ is also set up which follows the computed vehicle speed $Vv$ with a second predetermined speed difference $\Delta V2$ (e.g., 4 km/h). Mode 0 is first set up when the wheel speed $Vw > Vv2$; and modes 1 to 7 are set up as follows:

(1) Mode 1 is set up at a time point t10 when $Vw \leq Vv2$.

(2) Mode 2 is set up at a time point t11 when $Vw > Vv1$.

(3) Mode 3 is set up at a time point t12 when $Vw \leq Vv2$.

(4) Mode 4 is set up at a time point t13 when $Vw > Vv1$.

(5) Mode 5 is set up at a time t14 when $Vw \leq Vv2$.

(6) Mode 4 is set up at a time point t15 when $Vw > Vv1$.

(7) The above steps (5) and (6) are repeated.

In the foregoing mode setting-up procedure, the mode is reset to 0 when either of the following conditions (8) to (10) is satisfied:

(8) Time count is started at the time point t10, and a predetermined time period T1 (say 166 ms) terminates either at the time point t11 when the wheel speed $Vw$ exceeds the first threshold value $Vv1$ or at the time point t12 when the wheel speed $Vw$ becomes lower than the second threshold value $Vv2$;

(9) Time count is started at the time point t12, and th predetermined time period T1 terminates at the time point t13 or at the time point t14; and

(10) Time count is started at the time point t14, and t predetermined time period T1 terminates either at the time point t15 or at the time point t16.

In this embodiment, the modes are set up in accordance with the above-mentioned procedures, and the road surface on which the motor vehicle is running is judged as a rough road surface when the mode 4 or higher occurs.

Figure 4:
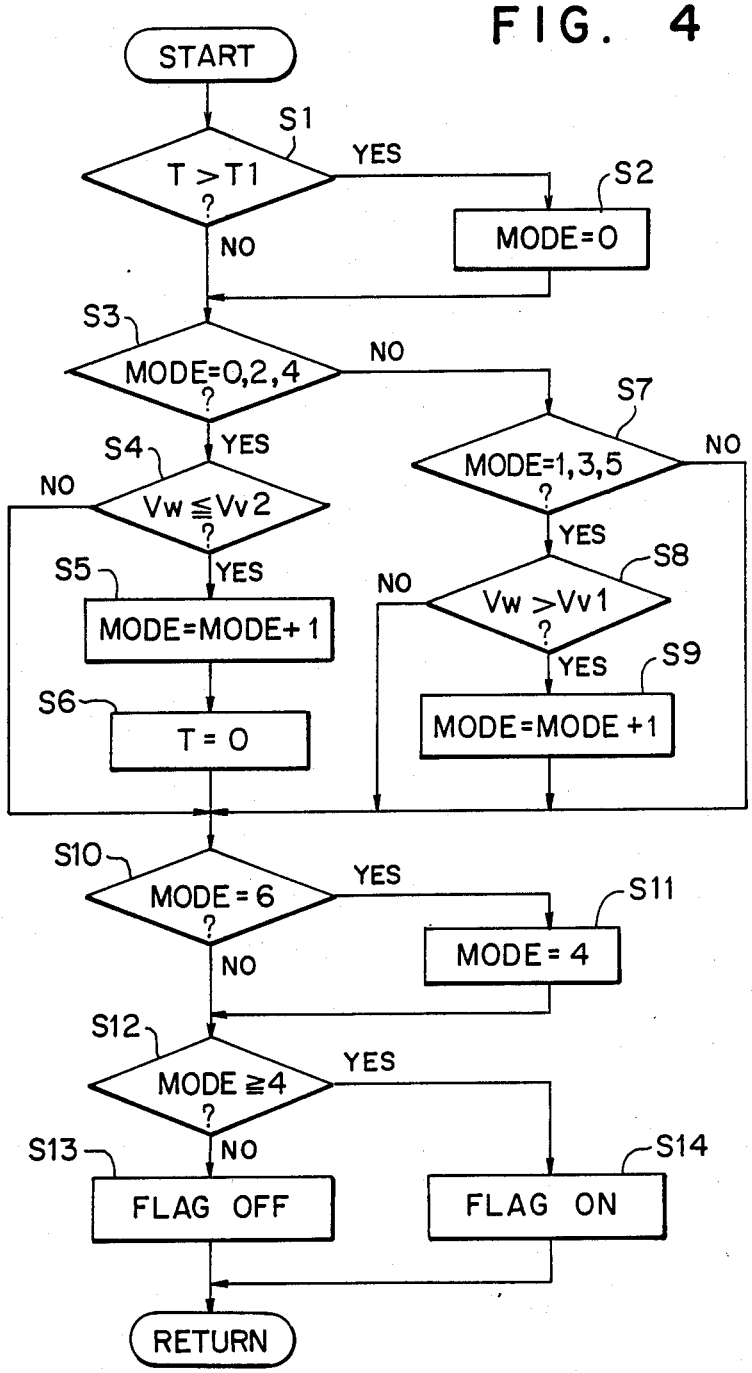
FIG. 4 is a flow chart useful for explaining rough-road judging routine in the anti-lock control system of FIG. 2.

FIG. 4 is a flow chart showing the operation of the above-mentioned rough-road judging sections 15 to 18. In FIGS. 3 and 4, the time period T is compared with the predetermined time period T1 (say 166 ms) at step S1; when T is equal to or greater than T1, the process proceeds directly to step S3; and when T is larger than T1, the mode is reset to the mode 0 at step 2 and the process proceeds to the step S3. At the steps S3, judgment is made as to whether or not nay of the modes 0, 2 and 4 occurs. The mode 0 remains set up until the time point t10 of FIG. 3 is reached, and the result of the judgment is "YES"; thus the process proceeds to step S4 at which judgment is made as to whether or not the wheel speed $Vw$ becomes equal to or lower than the threshold value $Vv2$. The result of this judgment is "NO", and the process proceeds to step S10 at which judgment is made as to whether or not the mode 6 occurs. The result of this judgment is "NO", and the process proceeds to step S12. At the step S12, judgment is made as to whether or not the mode 4 or higher one occurs. The result of this judgment is "NO", and the process proceeds to step S13 at which "rough-road" flag is held in "OFF" state.

From the time point t10 onward when the decelerating wheel speed Vw becomes lower than the threshold value Vv2, the result of the judgment at the step S4 becomes "YES", and the process proceeds to steps S5 at which numeral 1 is added to the mode 0 which is currently prevailing, so that the mode 1 is established. At step S6, a timer is reset to start measuring the time period T, and the processing procedures at the steps S10, S12 and S13 are repeated. When it is judged at the step S1 that the time period T is equal to or less than the predetermined time period T1, judgment is made, at the step S3, as to whether or not any of the modes 0, 2 and 4 occurs. Since the mode 1 prevailing at this time is the mode 1, the result of the judgment at the step S3 becomes "NO"; thus the process proceeds to step S7 at which judgment is made as to whether or not any of the modes 1, 3 and 5 is prevailing. The result of this judgment is "YES", and judgment is made, at step S8, as to whether or not the wheel speed Vw exceeds the threshold value Vv1. At this time, the result of the judgment is "NO", and the processing procedures at the above steps S10, S12 and S13 are repeated.

At the time point t11 of FIG. 3 when the wheel speed Vw changed from decrease to increase exceeds the threshold value Vv1, judgment is made, at the steps S1, as to whether nor the time period T elapsing from the time point t10 exceeds the predetermined time period T1. When the result of this judgment is "NO", the process proceeds to the step S3. The process further proceeds from the step S3 to the step S8 through the step S7. The result of the judgment at the step S8 is "YES", and the process proceeds to the next step S9 at which numeral 1 is added to the mode 1 so that the mode 2 occurs, and the processing procedures at the steps S10, S12 and S13 are repeated.

From the time point t12 of FIG. 3 onward when the wheel speed Vw changed from increase to decrease becomes equal to or lower than the threshold value Vv2 again the case where T is equal to or less than T1, the result of the judgment at the step S4 becomes "YES"; thus the mode 3 is set up at the step S5, and the time count at the timer is reset to 0 at the step S6, so that measurement of the time period T is started again.

From the time point t13 of FIG. 3 on ward when the wheel speed Vw further changed from deceleration to acceleration exceeds the threshold value Vv1 again in the case there T is equal to or less than T1, the result of the judgment at the step S8 becomes "YES" and the mode 4 is established at the step S9. The process then proceeds from step S10 to step S12, and the result of the judgment at the step S12 becomes "YES"; thus the rough-road judging condition is established and the rough-road flag is turned on at step S14.

In a similar manner, the mode 5 is set up at the step S5; at the time point t15, the mode is changed to the mode 6 at the step S9; the result of the judgment at the step S10 becomes "YES"; and the process proceeds to step S11 at which the mode 4 is set up. Such procedures are repeated subsequently, and during the mode 4 or 5, the rough-road flag is kept in the "ON" state.

Figure 5:
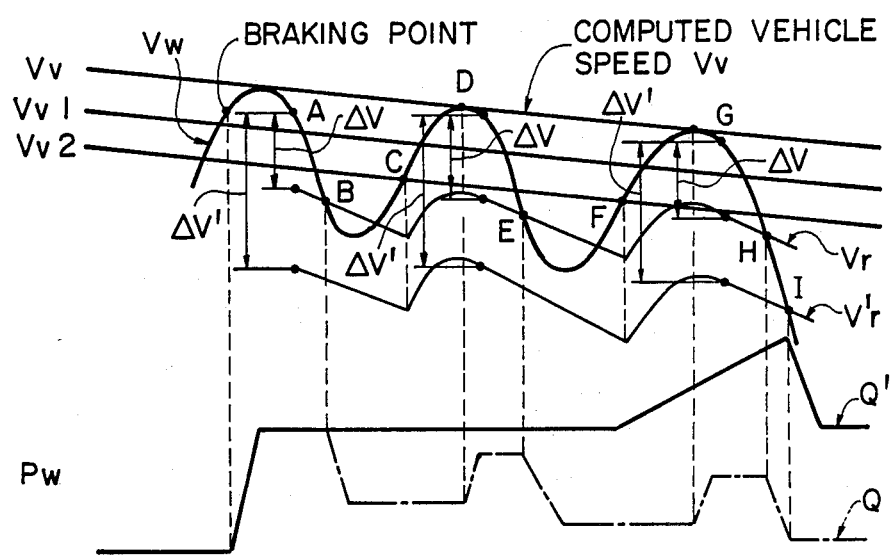
FIGS. 5 and 6 are views useful for explaining the operation of the anti-lock control system of FIG. 2.

FIG. 5 is a view useful for explaining the operation of this embodiment which is performed from a time point when braking is applied to a time point when the first reduction of the brake hydraulic pressure is started, and shows how the brake hydraulic pressure is controlled when braking is gradually applied while the motor vehicle is running on a rough road. In the ensuing description, the respective channel speeds Vs1 to Vs3 will be represented by the wheel speed Vw.

In the flow chart of FIG. 4, when the rough-road flag is turned on, reference wheel speed Vr, which constitutes reference for judgment of time point when reduction of the brake hydraulic pressure is started, is changed to a lower reference wheel speed Vr'.

The reference wheel speeds Vr and Vr' are first sep up in accordance with the following formulas (1) and (2) at a time point when the deceleration of the wheel speed Vw becomes equal to $-1.1G$ for example after braking is applied:

$$Vr = Vw - \Delta V \tag{1}$$

$$Vr' = Vw - \Delta V' \tag{2}$$

where $\Delta V'$ is set to $\Delta V + 5$ km/h for example.

Thereafter, the reference wheel speeds Vr and Vr' are decreased with a deceleration gradient of $-1.1G$; and $\Delta V$ and $\Delta V'$ are respectively set up in accordance with the above formulas (1) and (2) during the time period from a time point C when the speed difference between the wheel speed Vw changed from deceleration to acceleration and the reference wheel speed Vr becomes equal to or greater than $\Delta V$ (i.e. a time point when the speed difference between the wheel speed Vw and the reference wheel speed Vr' becomes equal to or greater than $\Delta V'$) and a time point D when the deceleration of the wheel speed Vw changed from acceleration to deceleration again becomes equal to $-1.1G$. At the time points D and G, the values for $\Delta V$ and $\Delta V'$ are set up in a manner similar to that at the time point A; and at time point F, such values are set up in a manner similar to that at the time point C.

The method of judging pressure reduction starting point will next be described with reference to FIG. 5. In FIG. 5, a chain line Q shows how the brake hydraulic pressure is changed in the case where the pressure reduction starting point is judged on the basis of the first reference wheel speed Vr, and a solid line Q' indicates how the brake hydraulic pressure is changed in the case where the pressure reduction starting point is judged on the basis of the second reference wheel speed Vr' when a "rough road" logic mode is set up. More specifically, when no rough-road judging condition is established, pressure reduction is started at time points B, E and H when the decelerating wheel speed Vw becomes equal to the reference wheel speed Vr. When the rough-road judging condition is established, pressure reduction is first started at a time point I when the decelerating wheel speed Vw and reference wheel speed Vr' cross each other. The rough-road logic mode which is set up during the time period from the time point when braking is applied to the pressure reduction starting point I, is provided with a view to reducing the frequency at which anti-lock control operation is performed when braking is gradually applied while the motor vehicle is running on a rough road as well as maintaining a braking force corresponding to a depressing force which is imparted to the brake pedal by the driver.

Figure 6:
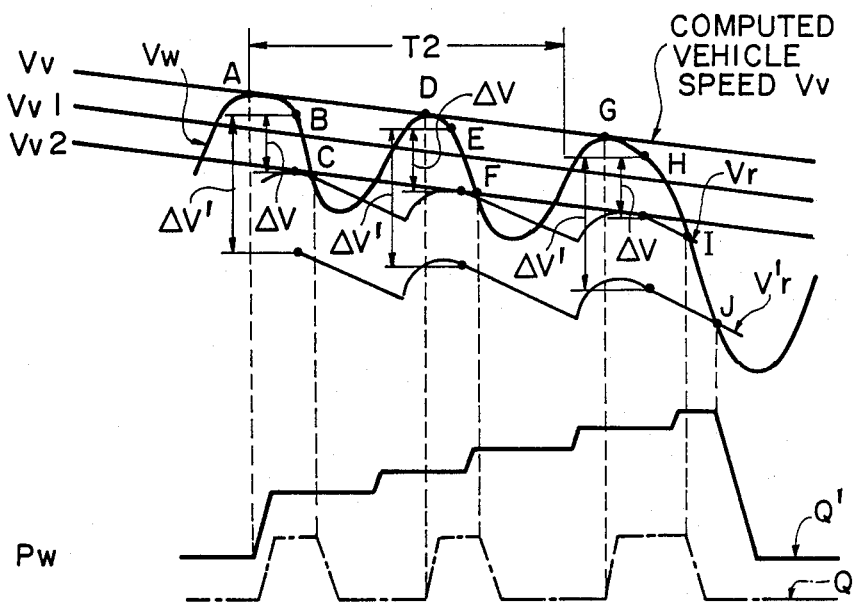

FIG. 6 is a view showing how the brake hydraulic pressure is controlled, and useful for explaining the operation performed at the next pressure buildup starting time point subsequent to the time point when the reduction of the brake hydraulic pressure was started on the basis of the reference wheel speed Vr', in the embodiment of the present invention.

As in FIG. 5, the reference wheel speeds Vr and Vr' are set up so as to follow the wheel speed Vw with predetermined speed differences $\Delta V$ and $\Delta V'$, and to linearly decrease with the deceleration gradient of $-1.1G$ from time points B, E and H when the deceleration of the wheel speed Vw becomes equal to $-1.1G$. Therefore, further description thereof will be omitted.

In FIG. 6, a chain line Q shows how the brake hydraulic pressure Pw is changed in the case where judgment of pressure reduction starting point is effected on the basis of the first reference wheel speed Vr, and a solid line Q' indicates how the brake hydraulic pressure Pw is changed in the case where judgment of pressure reduction starting point is effected on the basis of the second reference wheel speed Vr'.

When no rough-road judging condition is established at a pressure buildup starting up A when a high peak of the wheel speed Vw occurs and buildup of the brake hydraulic pressure Pw is started, normal anti-lock control is performed so that pressure reduction is started at time points C, F and I when the decelerating wheel speed Vw and the reference wheel speed Vr cross each other and pressure buildup is started at time points D and G when a high peak of the wheel speed Vw occurs.

When the rough-road judging condition is established after the pressure buildup starting point A, pressure reduction judgment is effected by using the reference wheel speed Vr' until a predetermine time period T2, say 0.2 to 0.3 sec. elapses from the pressure buildup starting point A, and pressure reduction is started at time point when the wheel speed Vw and the reference wheel speed Vr' cross each other.

When the rough-road judging condition is established after the pressure buildup starting point but the rough-road judgment is cancelled after the time period T2 elapses from the pressure buildup starting point A, pressure reduction is started gain at the time point I when the wheel speed Vw and the reference wheel speed Vr cross each other. However, when the rough-road judgment is not cancelled even after the time period T2 elapses, pressure reduction is started at a time point J when the wheel speed Vw and the reference wheel speed Vr' cross each other.

By utilizing the above-mentioned rough-road logic mode set up at and after the second control cycle in the case where anti-lock control is effected when "rough road" braking is applied, it is possible to prevent the brake hydraulic pressure from becoming short as a result of being frequently subjected to early reduction due to changes in the wheel speed which occur as the motor vehicle runs on a rough road, and it is also possible to increase the brake hydraulic pressure up to a suitable level.

The speed difference $\Delta V'$ with which the reference wheel speed Vr' follows the wheel speed Vw is normally set up so that $\Delta V' = \Delta V + 5$ km/h for example. On the other hand, in the case where pressure reduction is started on the basis of the reference wheel speed Vr' in the previous control cycle and the rough-road judging condition is still established at the subsequent pressure buildup starting point, $\Delta V'$ is changed to $\Delta V'' = \Delta V + 10$ km/h. As mentioned above, the reference wheel speed Vr' is set up in two stages; In the first rough-road judgment, the rough-road logic mode is applied by setting up $\Delta V'$ according to the expression $\Delta V' = \Delta V + 5$ km/h.; and when the rough-road judging condition is still prevailing and thus is becomes more definite that the road on which the motor vehicle is running is a rough road, $\Delta V'$ is changed to $\Delta V'' = \Delta V + 10$ km/h. In this way, it is possible to avoid any adverse effects which would otherwise result from application of the "rough-road" logic mode when the motor vehicle is running on a low-$\mu$ road surface or at a low speed.

Further, in such a "rough-road" logic mode set up at and after the second control cycle, when the deceleration gradient of the computed vehicle speed Vv between the pressure buildup starting points in the previous and current cycles is steeper than $-0.1G$ for example, or when the computed vehicle speed Vv is lower than a predetermined speed, say 15 km/h, the means for coping with rough is not applied, and reduction of the brake hydraulic pressure is started on the basis of the reference wheel speed Vr. In this way, it is possible to avoid any adverse effects which would otherwise result from application of the "rough-road" logic mode when the motor vehicle is running on a low-$\mu$ road surface or at a low speed.

When the above rough-road judging condition is established and reduction of the brake hydraulic pressure is started on the basis of the reference wheel speed Vr', a flag showing that fact is turned on, which will be referred to as "Vr' flag" hereinafter.

Figure 7B:
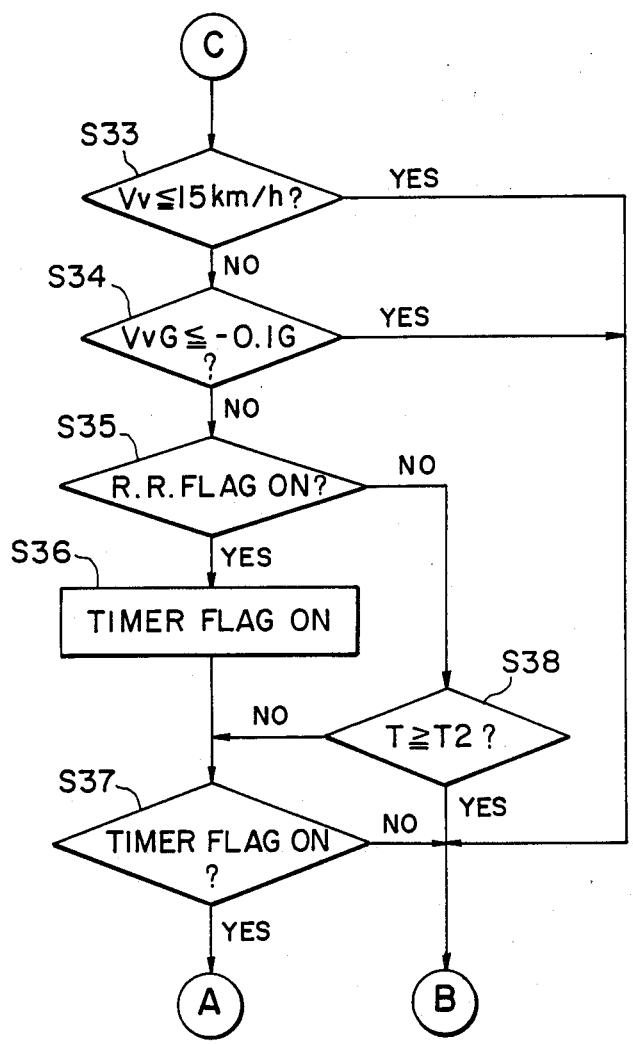
FIG. 7(A) and (B) is a flow chart useful for explaining pressure reduction starting point judging routine in the anti-lock control system of FIG. 2.

FIG. 7 is a flow chart showing the operation of the pressure reduction starting point judging sections 19 to 21 for effecting the above-mentioned pressure reduction starting judgment. Description will be made separately with respect to the preceding time period from the time point when braking is application, to the time point when the first pressure reduction is started on the basis of the reference wheel speed Vr', i.e., the time period which lapses by the time when the Vr' flag is turned on, and with respect to the time period following the second control cycle started at the subsequent pressure buildup starting point.

During the above-mentioned preceding time period, judgment is first made, at step S20, as to whether or not the Vr' flag is turned on. The result of the this judgment is "NO", and the reference wheel speed Vr' is set up according to the formula $Vr' = Vr - 5$ km/h at step S21. At step S22, judgment is made as to whether or not the anti-lock control is being effected, i.e., as to whether it is after the first pressure reduction starting point. In this case, the result of the judgment at the step S22 is "NO"; thus the process proceeds to step S23 where the Vr' flag is "OFF"; and the process proceeds to step S24 where judgment is made as to whether or not the rough-rough flag is "ON". When no rough-road judging condition is established and thus the result of the judgment at the step S24 is "NO", the process proceeds to step S25 where the wheel speed Vw and the reference wheel speed Vr are compared with each other. When the wheel speed Vw is equal to or lower than the reference wheel speed Vr, the process proceeds to step S26 where the Vr' flag is "OFF". At the next step S27, a timer flag is "OFF"; a pressure reduction mode is set up at the next step S28; and pressure reduction is effected at step S29 by turning on both the hold valves and the decay valves. When the result of the judgment at the step S24 indicates that the rough-road judging condition is established and thus the "rough road" flag is "ON", the process proceeds to step S30 where the wheel speed Vw and the reference wheel speed Vr' are compared with each other. When the wheel speed Vw is equal to or lower than the reference wheel speed Vr', the process proceeds to step S31 the Vr' flag is "ON", while the timer flag is "OFF" at the step S27; and the pressure reduction mode is set up at the step S28 and pressure reduction is started at the step S29. The switches SW1 to SW3 of FIG. 2 remain turned off during the period from this pressure reduction point to the subsequent pressure buildup starting point.

Description will next be made of the control operation performed at the second and succeeding control cycles of the anti-lock control (after the subsequent pressure buildup starting point). When the rough-road judging condition is established in the previous cycle and thus pressure reduction is started on the basis of the reference wheel speed Vr', and Vr' flag is "ON" (at the step S31) and thus the result of the judgment at the step S20 becomes "YES" so that the process proceeds to step S32 where the reference wheel speed Vr' is set up according to the formula Vr'=Vr−10 km/h. The result of the judgment at the step S22 is "YES", and thus the process proceeds to step S33 where judgment is made as to whether or not the computed vehicle speed Vr is equal to or lower than 15 km/h. When the result of this judgment is "NO", the process proceeds to step S34 where judgment is made as to whether or not the deceleration gradient of the computed vehicle speed Vv between the pressure buildup starting points at the previous and current cycles is steeper than 0.1G. When the result of the judgment at the step S33 is "YES" or the result of the judgment at the step S34 is "YES", the process goes to the step S25 where pressure reduction starting judgment is effected based on a comparison of the wheel speed Vw and the reference wheel speed Vr.

When the result of the judgment at the step S33 and that at the step S34 are both "NO", the process proceeds to step S35 where judgment is made as to whether or not the rough-road flag is "ON". When the rough-road judging condition is still established and the rough-road flag is "ON" at and after the second control cycle, the timer flag is turned "ON" at step S36. This timer flag is provided to hold the rough-road logic mode during a predetermined time period T2. The process goes, through step S37, to the step S30 where pressure reduction staring judgment is made based on a comparison of the wheel speed Vw and the reference wheel speed Vr'. When no rough-road judging condition is established and thus the result of the judgment at the step S35 become "NO", the time period T elapsing from the pressure buildup starting point at and after the second control cycle is compared with the predetermined time period T2 at step S38. When T is less than T2 and the result of the judgment at the step S38 is "NO", the process proceeds to the step S37 where judgment is made as to whether or not the timer flag is "ON". When the result of this judgment is "YES", the process goes to the step S30 where the pressure reduction starting judgment is made on the basis of the reference wheel speed Vr'. In contrast thereto, when T is equal to or greater than T2 and the result of the judgment at the step S38 is "YES", or when the result of the judgment at the step S37 is "NO" the process goes to the step S25 where the pressure reduction starting judgment is made on the basis of the reference wheel speed Vr.

As will be appreciated from the above discussion, in accordance with the foregoing embodiment of this invention, during the time period from a time point when braking is applied, to a time point when pressure reduction is started, it is possible to reduce the frequency at which the anti-lock control operation is performed during the braking operation when the motor vehicle is running on a rough road, and it is also possible to maintain a braking force corresponding to the depression force imparted to the brake pedal by the driver. Further, at and after the second control cycle in the anti-lock control, it is possible to prevent reduction of the brake hydraulic pressure from being started early due to changes in the wheel speed which tend to occur when the motor vehicle is running on a rough road, and it is also possible to increase the brake hydraulic pressure up to a suitable level, thereby reducing the braking distance of the motor vehicle.

Furthermore, in accordance with the above-described embodiment of the present invention, the reference wheel speed Vr' which is used for making pressure reduction startig judgment when the motor vehicle is running on a rough road, is set up in two stages, and the operation of the means for coping with a rough road is interrupted when such two conditions as defined at the steps S33 and S34 are satisfied; thus, it is possible to eliminate problems such as occurrence of early lock and so forth which would otherwise be caused in the case where a low-$\mu$ road is misjudged as a rough road, or in the case where the rough-road logic mode is applied when the motor vehicle is running at a low speed.

Although in the foregoing discussion, description has been made of the case where the present invention was applied to a three-channel type brake system in which three wheels, i.e., the lower one of the lefthand and righthand rear wheel speeds, and the front wheel speeds are used as the respective channel speeds, it is to be understood that the present invention is by no means limited thereto but applicable to any other type of brake apparatus as well.

We claim:

1. An anti-lock control system for motor vehicles wherein a respective wheel speed Vw of the motor vehicle is detected; a computed vehicle speed Vv approximate to the real vehicle speed is calculated on the basis of the detected wheel speeds; a reference wheel speed Vr is set up which follows said wheel speed Vw with a predetermined speed difference $\Delta V$ and decelerates from a point of time when the deceleration of the wheel speed Vw becomes equal to a predetermined value; and reduction of the brake hydraulic pressure is started at a point of time when the decelerating wheel speed Vw becomes equal to the reference wheel speed Vr, said anti-lock control system comprising:

a first means for setting up first and second threshold values Vv1 and Vv2 which follow said computed vehicle speed Vv with predetermined speed differences $\Delta V1$ and $\Delta V2$, said first threshold value being higher than said second threshold value;

a second means for measuring a time period T during which said wheel speed Vw which accelerates and decelerates in repetition reciprocates once between said first and second threshold values Vv1 and Vv2; and a third means for changing said reference wheel speed Vr to a second reference wheel speed Vr' on the basis of a predetermined speed difference $\Delta V'$ which is greater than said speed difference $\Delta V$ when it is detected that the time period T is shorter than said predetermined time period T1.

2. An anti-lock system according to claim 1, wherein said computed vehicle speed Vv is a speed achieved by selecting the highest one of four wheel speeds and having its acceleration and deceleration limited in a predetermined range.

3. An anti-lock system according to claim 2, wherein said predetermined range of acceleration and deceleration is from +1G to −1G.

4. An anti-lock system according to claim 1, wherein said first and second threshold values Vv1 and Vv2 are lower than said computed vehicle speed Vv by 2.5 km/h and 4 km/h respectively.

5. An anti-lock control system according to claim 1 wherein said reference wheel speed Vr is a speed which follows said wheel speed Vw with a predetermined speed difference until the deceleration of the decelerating wheel speed Vw reaches −1.1G, and is linearly decreased with a deceleration gradient of −1.1G from a point of time when the deceleration of said wheel speed Vw becomes equal to −1.1G.

6. An anti-lock control system according to claim 5, wherein said speed difference ΔV is set to 5 km/h.

7. An anti-lock system according to claim 1, wherein said predetermined time period T1 is set to 166 ms.

8. An anti-lock control system according to claim 1, wherein said speed difference ΔV′ is set to ΔV+5 km/h.

9. An anti-lock control system according to claim 1, further comprising a fourth means for changing the speed difference ΔV′ with which said second reference wheel speed Vr′ follows said wheel speed Vw to a greater speed difference ΔV″ when a rough-road judging condition is established at and after a second control cycle started at a subsequent pressure buildup starting point after reduction of the brake hydraulic pressure is started on the basis of said second reference wheel speed Vr′.

10. An anti-lock control system according to claim 9, wherein said speed difference ΔV″ is to ΔV+10 km/h.

11. An anti-lock control system according to claim 1, further comprising a fifth means for staring reduction of the brake hydraulic pressure on the basis of said first reference wheel speed Vr when the deceleration gradient of said computed vehicle speed Vv between pressure buildup starting points in previous and current control cycles is steeper than a predetermined deceleration gradient, and/or when said computed vehicle speed Vv is lower than a predetermined speed, at and after a second control cycle started at a subsequent pressure buildup starting point after reduction of the brake hydraulic pressure is started on the basis of said second reference wheel speed Vr′.

12. An anti-lock control system according to claim 11, wherein said predetermined deceleration gradient is set to −0.1G.

13. An anti-lock control system according to claim 11, wherein said predetermiined speed is set to 15 km/h.

* * * * *